United States Patent
Ghara et al.

[11] Patent Number: 6,152,608
[45] Date of Patent: Nov. 28, 2000

[54] SNAP LOCK CONNECTOR FOR OPTICAL FIBER SYSTEMS

[75] Inventors: Mehrad Ghara, Laguna Niguel; Louis Frank Kardos, Fountain Valley, both of Calif.

[73] Assignee: Packard Hughes Interconnect Company, Irvine, Calif.

[21] Appl. No.: 09/058,551

[22] Filed: Apr. 10, 1998

[51] Int. Cl.[7] .............................. G02B 6/38; H01R 13/24
[52] U.S. Cl. ................. 385/60; 385/78; 439/824
[58] Field of Search ........................ 385/60, 78; 439/675, 439/700, 824, 836

[56] References Cited

U.S. PATENT DOCUMENTS

| | | | |
|---|---|---|---|
| 1,667,485 | 4/1928 | Macdonald | 439/836 |
| 3,953,098 | 4/1976 | Avery et al. | 439/258 |
| 4,707,068 | 11/1987 | Moulin . | |
| 4,747,656 | 5/1988 | Miyahara et al. | 385/75 |
| 5,125,056 | 6/1992 | Hughes et al. | 385/59 |
| 5,129,023 | 7/1992 | Anderson et al. | 385/70 |
| 5,337,386 | 8/1994 | Noll et al. | 385/60 |

*Primary Examiner*—Rodney Bovernick
*Assistant Examiner*—Michael J. Stahl
*Attorney, Agent, or Firm*—Patrick M. Griffin

[57] ABSTRACT

A snap lock connector particularly well suited to optical fiber systems, is composed generally of a receptacle body having a socket and a plug body having a number of collet fingers. A first fiber optic cable is connected to a first ceramic terminus having a first face inside the socket. A second fiber optic cable is connected to a second ceramic terminus having a second face inside the collet fingers. The first ceramic terminus is fixedly connected to the receptacle body in axial alignment therewith; and the second ceramic terminus is resiliently biased with respect to the plug body in axial alignment therewith. The exterior of the receptacle body has a circumscribed groove for engaging the tips of the collet fingers. The plug body has a locking sleeve slidably mounted thereon for being selectively slid over the collet fingers. In operation, a user presses together the receptacle and plug bodies until the first and second faces abut and the collet fingers resiliently return to their relaxed state as the tips thereof enter into the groove. At this point, the tips of the collet fingers are tending to exit the groove due to the resilient biasing of the fiber optic cables which is tending to separate the plug and receptacle bodies from each other. The user slides the locking sleeve toward its forward position, whereupon the collet fingers are compressed toward each other so as to retain the tips in the groove. This sliding movement of the locking sleeve over the collet fingers is of a highly frictional nature, resulting in an audible snapping sound.

17 Claims, 3 Drawing Sheets

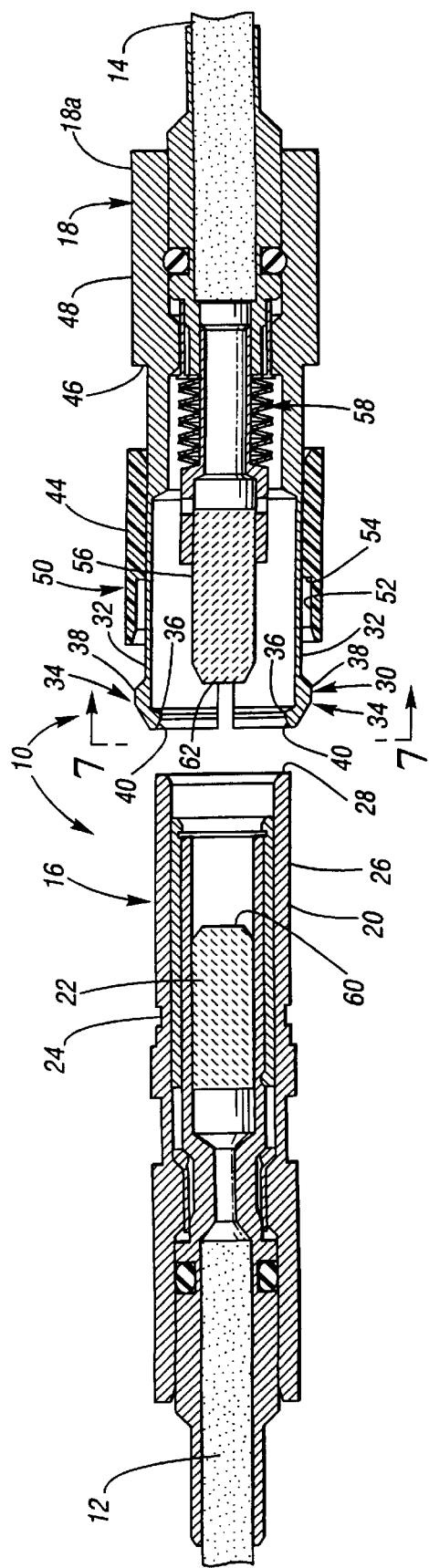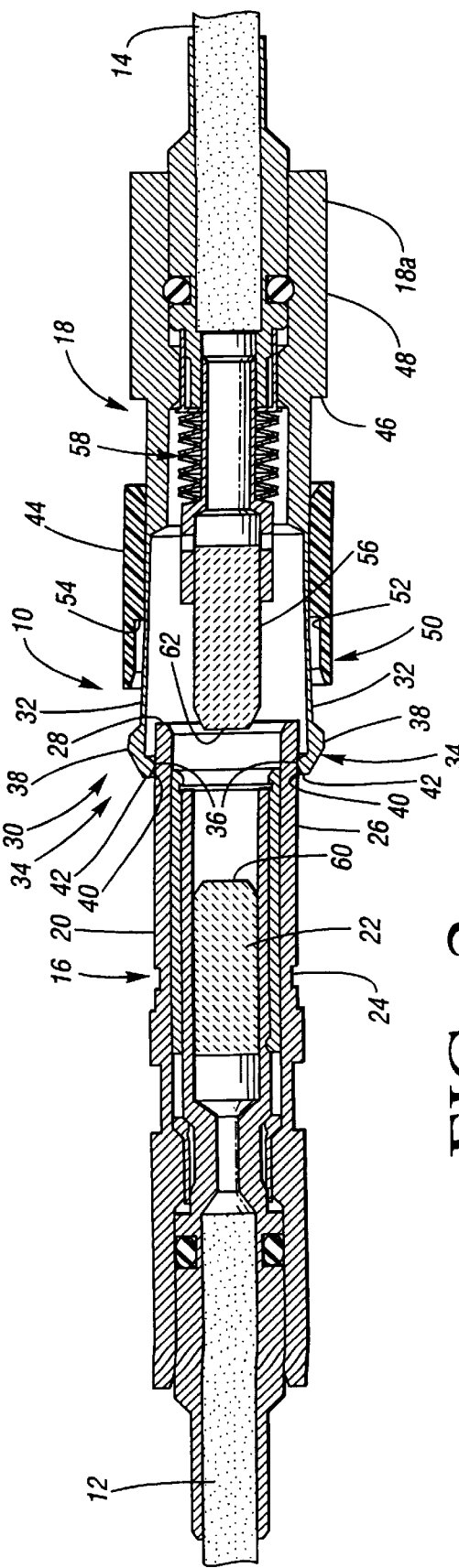
FIG. 1
FIG. 2

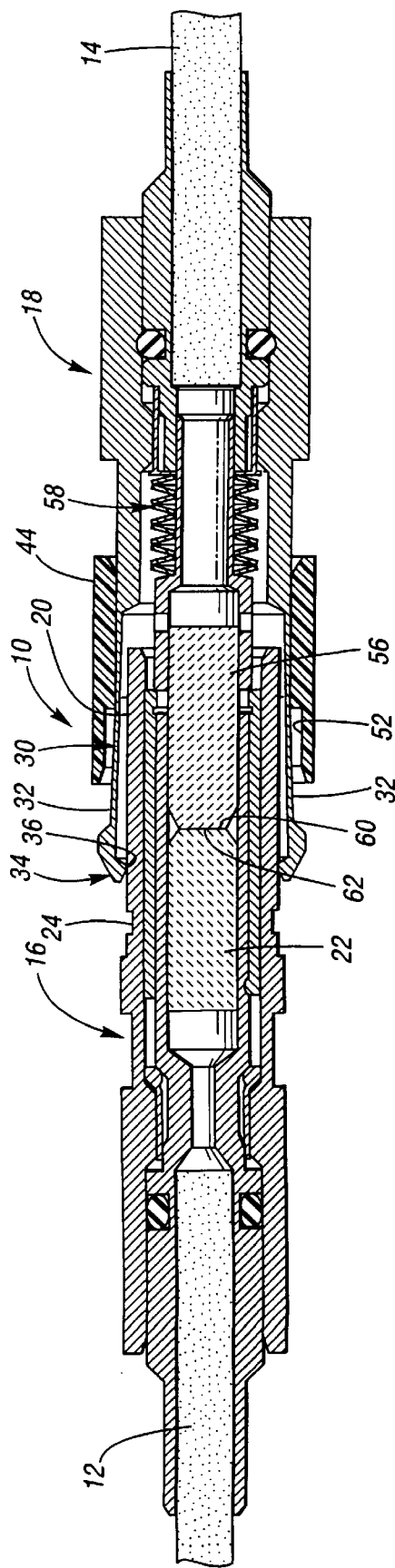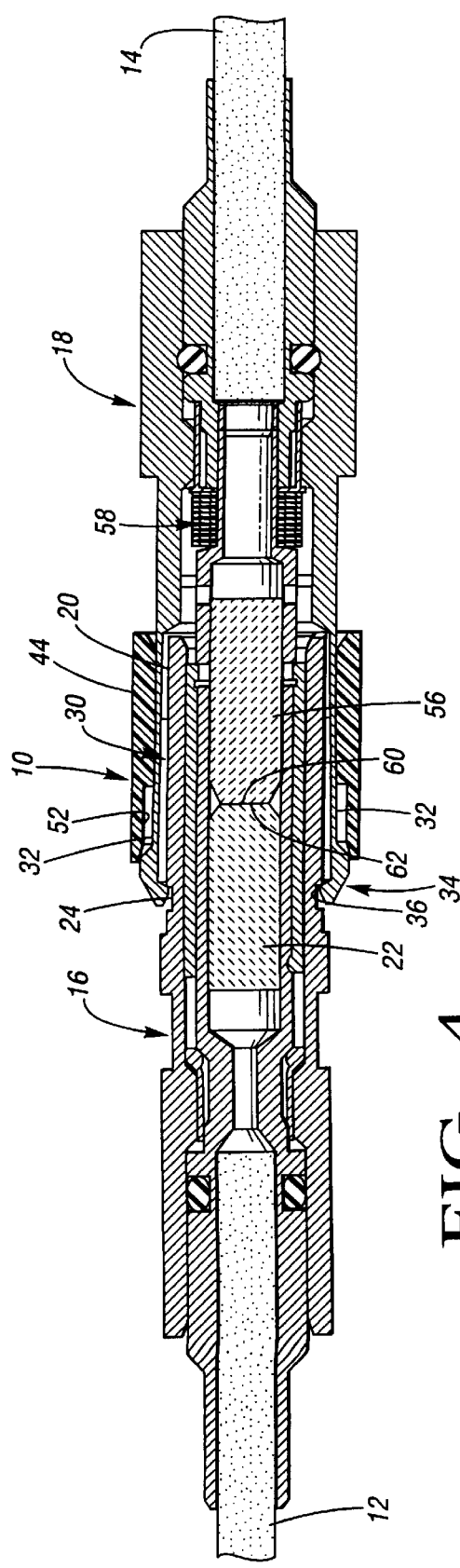

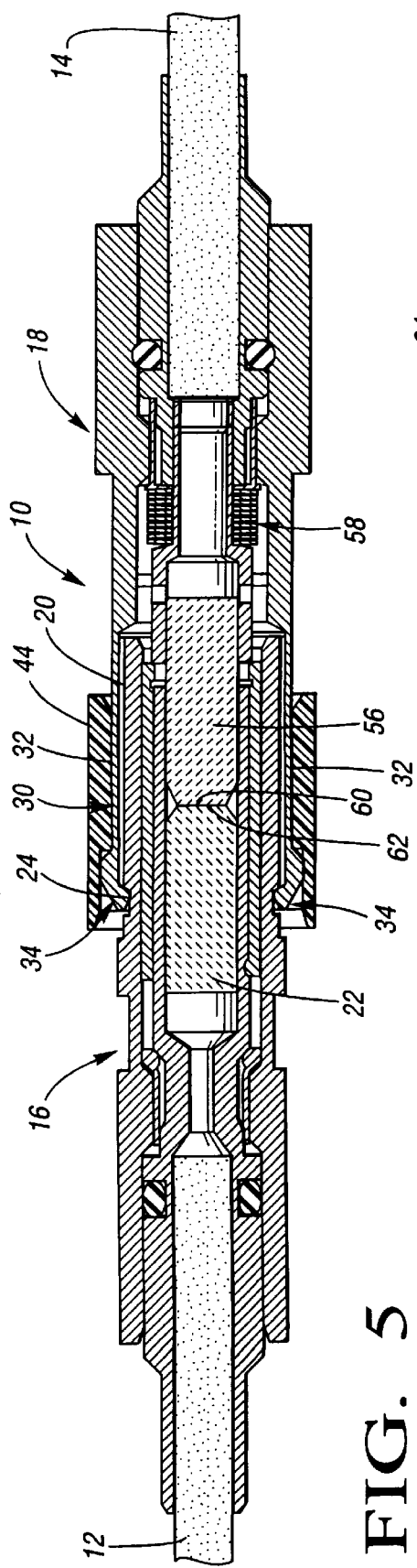
FIG. 5
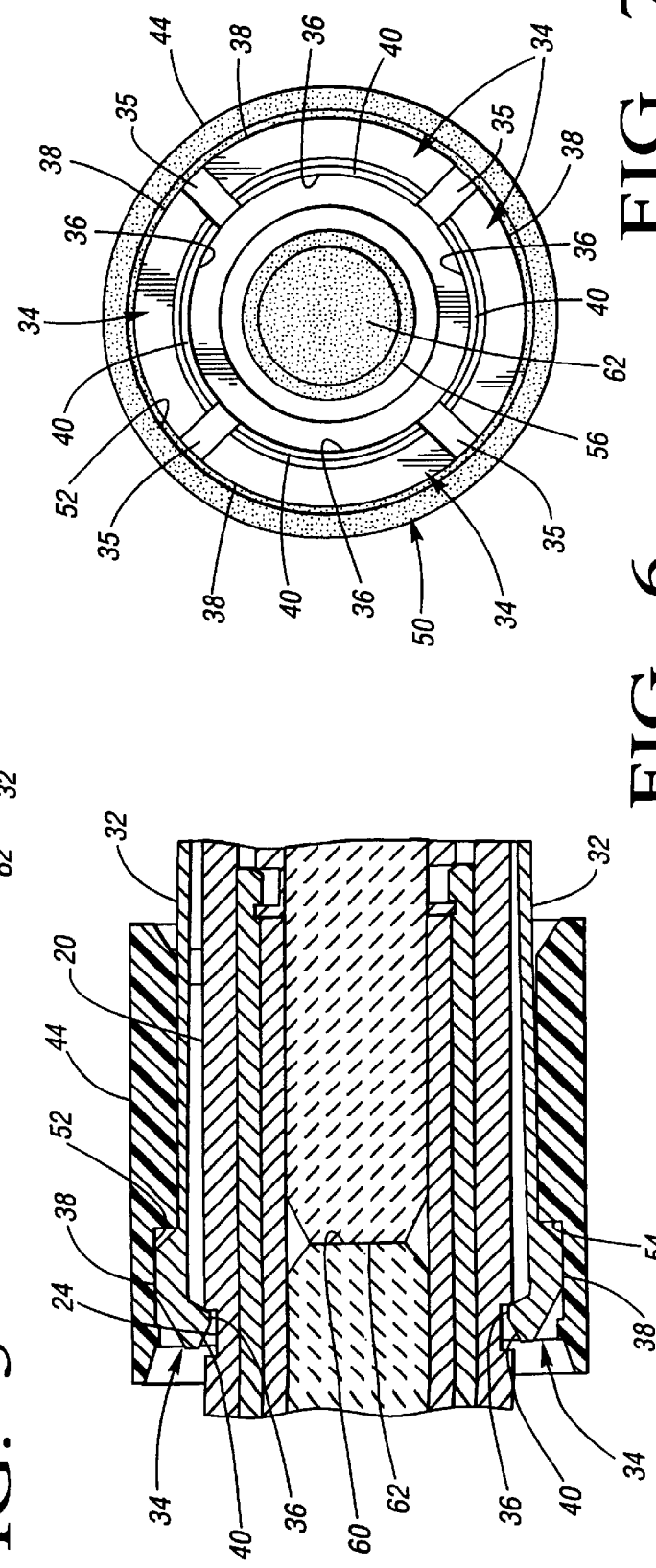
FIG. 7
FIG. 6

SNAP LOCK CONNECTOR FOR OPTICAL FIBER SYSTEMS

TECHNICAL FIELD

The present invention relates to connectors used to reliably abut end faces of fiber optic cable segments.

BACKGROUND OF THE INVENTION

Fiber optic cable systems are becoming increasingly favored as the medium of choice for data transmission for a number of reasons, one of which being a signal band width greatly increased over that possible with conventional metallic wire systems. The reason for this increase in band width is the fact that fiber optic cables transmit data via light traveling therealong at or around the visible and near infrared wavelengths, hereinafter referred to simply as "light". To provide for transmission of light, fiber optic cables are composed of a transparent material, as for example glass or plastic, preferably configured as a long, thin, flexible fiber.

Because fiber optic cables transmit light, and because it is inevitable that discrete sections of fiber optic cable must be joined in order to form a desired length of fiber optic cable, it is important that the connections used for this joining be as perfect as is feasible. Unless the connections are sufficiently perfect so that the faces of abutting fiber optic cables are aligned and in tight abutment with each other, unacceptable energy and signal losses will likely be incurred at the connection. Thus, as beneficial as fiber optic cable systems may be, they are subject to the limitations imposed by the connectors used therewith.

An example of a prior art connector for fiber optical systems is described in U.S. Pat. No. 4,707,068, dated Nov. 17, 1987. Prior art connectors for fiber optical systems typically rely upon a threaded or bayonet type of coupling mechanism which does not have a positive indication of good connection (such as an audible "snap"), nor are they suitable for being manufactured in a compact size.

Accordingly, what is needed in the art is a fiber optic cable connector which is reliable, easily operated, assures a good face-to-face abutment of the joined fiber optic cable segments while being unaffected by foreseeable environmental factors, affords an audible sound that connection has been effected, and is compact in size.

SUMMARY OF THE INVENTION

The present invention is a snap lock connector particularly well suited to optical fiber systems, in that it provides good face-to-face abutment of the joined fiber optic cable segments while being unaffected by foreseeable environmental factors. While the snap lock connector is preferred to be used to connect fiber optic cable segments of optical fiber systems, it is to be understood that it may be adapted by those of ordinary skill in the art, referencing the hereinbelow disclosure and accompanying drawings, to connect components of other types of systems, such as for example metallic wire systems and hybrids of metallic wire and fiber optic cable systems.

The snap lock connector according to the present invention is composed generally of a receptacle body having a socket and a plug body having a number of collet fingers. A first fiber optic cable is connected to a first ceramic terminus having a first face inside the socket. A second fiber optic cable is connected to a second ceramic terminus having a second face inside the collet fingers. The first ceramic terminus is fixedly connected to the receptacle body in axial alignment therewith; and the second ceramic terminus is resiliently biased with respect to the plug body in axial alignment therewith. The exterior of the receptacle body has an annular groove for engaging the tips of the collet fingers. The plug body has a locking sleeve slidably mounted thereon for being selectively slid over the collet fingers.

In operation, with the locking sleeve pushed to its rearward position, a user presses together the receptacle and plug bodies. In so doing the tips of the collet fingers are expanded by engagement with the external surface of the receptacle body. Sliding continues until the first and second faces abut and the collet fingers resiliently return to their relaxed state as the tips thereof enter into the groove. At this point, the tips of the collet fingers are tending to exit the groove due to the resilient biasing of the fiber optic cables which is tending to separate the plug and receptacle bodies from each other.

In order to prevent the tips of the collet fingers from exiting the groove, and to hold them grippingly therein, the user slides the locking sleeve toward its forward position, whereupon the collet fingers are compressed toward each other so as to retain the tips in the groove. This sliding movement of the locking sleeve over the collet fingers is of a highly frictional nature, resulting in an audible snapping sound. Further, the frictional engagement of the collet fingers with the locking sleeve holds the locking sleeve at the collet fingers, whereby the locking sleeve prevents the tips thereof from exiting the groove. Accordingly, even in adverse environments, including those involving vibration, the plug and receptacle bodies cannot separate from each other. Advantageously, the collet finger, groove and locking sleeve combination provides a structure which is manufacturable in very compact size relative to the diameters of the fiber optic cables.

In order to separate the plug and receptacle bodies from each other, the user need only slide the locking sleeve to its rearward position and then apply a separating tug to cause the tips of the collet fingers to exit the groove and slide over the exterior of the receptacle body until the plug and receptacle bodies are separated.

Accordingly, it is an object of the present invention to provide a connector for fiber optical systems which provides a good connection that is not affected by vibration.

It is an additional object of the present invention to provide a connector for interconnecting two components which features an audible snapping interaction that keeps the two components in an engaged relation even in the face of environmental factors.

It is a further object of the present invention to provide a fiber optic cable connector having a very compact size.

These, and additional objects, advantages, features and benefits of the present invention will become apparent from the following specification.

BRIEF DESCRIPTION OF THE DRAWINGS

FIG. 1 is a partly sectional side view of the snap lock connector according to the present invention, shown in operation with respect to two segments of fiber optic cable, wherein the plug and receptacle bodies thereof are shown mutually separated.

FIG. 2 is a partly sectional side view of the snap lock connector as in FIG. 1, wherein the plug and receptacle bodies thereof are shown at an initial stage of connection.

FIG. 3 is a partly sectional side view of the snap lock connector as in FIG. 1, wherein the plug and receptacle bodies thereof are shown at a further stage of connection.

FIG. 4 is a partly sectional side view of the snap lock connector as in FIG. 1, wherein the plug and receptacle bodies thereof are shown at a yet further stage of connection.

FIG. 5 is a partly sectional side view of the snap lock connector as in FIG. 1, wherein the plug and receptacle bodies thereof are shown connected.

FIG. 6 is a detail, partly sectional side view showing the interaction of the locking sleeve, collet fingers and annular groove of the snap lock connector as shown at FIG. 5.

FIG. 7 is an end view seen along line 7—7 in FIG. 1.

DESCRIPTION OF THE PREFERRED EMBODIMENT

Referring now to the Drawings, FIG. 1 generally depicts the snap lock connector 10 according to the present invention in an exemplary environment of operation with respect to a first fiber optic cable 12 and a second fiber optic cable 14. In this example of operation, the snap lock connector 10 includes a receptacle body 16 interfaced with the first fiber optic cable 12 and a plug body 18 interfaced with the second fiber optic cable 14.

The receptacle body 16 preferably has a cylindrical shape, including an annular nose 20. Interior to the receptacle body 16, a first ceramic terminus 22 is fixedly connected, and which is, in turn, connected to the first fiber optic cable 12. A groove 24 is circumscribably formed in the external surface 26 of the nose 20 in spaced relation to a forward end 28 of the receptacle body 16.

The plug body 18 is also preferably cylindrical in shape, including a main portion 18a and an integrally formed collet 30 formed of a plurality of collet fingers 32, wherein the preferred number of collet fingers is four (see FIG. 7). The collet fingers 32 are defined by axially oriented cuts 35 therebetween, wherein the collet fingers are resiliently disposed relative to the main portion 18a of the plug body 18.

Each of the collet fingers 32 includes a generally claw-shaped tip 34 characterized by a radially inward facing boss 36 and a radially outward facing abutment 38. Each boss 36 includes a chamfer 40 at the forward end 42 thereof. The disposition of the bosses 36 relative to the external surface 26 of the nose 20 is such that the collet fingers 32 are resiliently spread apart in the radially outward direction when the nose is pushed into the collet 30; however, the collet fingers resume their relaxed state when the bosses 36 enter into the groove 24.

A locking sleeve 44 is slidably disposed on the collet 30, and is slidable between the abutments 38 and a land 46 formed in an external surface 48 of the main portion 18a of the plug body 18. A forward portion 50 of the locking sleeve 44 has a recess 52 adjacent the collet 30, wherein the recess is freely passable over the abutments 38 when the collet fingers 32 are in their relaxed state. In this regard, the annular end wall 54 of the recess 52 is abuttably engageable with the abutments 38 to thereby trap the locking sleeve 44 on the collet 30.

Within the plug body 18 is a second ceramic terminus 56 which is connected with the second fiber optic cable 14. The second ceramic terminus 56 is mounted relative to the plug body in a resiliently biased manner, as for example via a stack of disc springs (also referred to sometimes as "Belleville washers") 58. The first ceramic terminus 22 has a first face 60, and the second ceramic terminus 56 has a second face 62. In this regard, the snap lock connector 10 serves to abut the first and second faces 60, 62 in an aligned and resiliently biased manner; however, it will be understood that the faces of other types of components (such as electrodes of metallic wires) could be so abutted. A description of the structures suitable for providing a proper interconnection of a typical optic fiber interface is described in U.S. Pat. No. 4,707,068, hereby herein incorporated by reference, and need not be further described herein.

Operation of the snap lock connector 10 will now be described, with particular attention being directed to the progressively sequential views of FIGS. 2 through 5.

The user grasps the receptacle and plug bodies 16, 18 and aligns the nose 20 to the collet 30. With the locking sleeve 44 rearwardly positioned away from the tips 34, the nose is then brought up to the tips, whereupon the nose slides along the chamfer 40 thereby causing the collet fingers 32 to be resiliently bent in a radially outward direction. The nose is pushed further into the collet until the bosses 36 drop grippingly into the groove 24 in response to the resiliency of the collet fingers. At this location, the first and second faces 60, 62 are in aligned abutment and are resiliently biased toward each other by compression of the disc springs 58.

The resilient biasing of the first and second faces tends to cause the bosses to exit the groove. Consequently, the bosses 36 tend to be partly exited from the groove and the abutments 38 are displaced radially outward further than when the collet fingers are in their relaxed state.

Therefore, when the user slides the locking sleeve forwardly toward the tips, the recess 52 tightly engages the abutments, resulting in an audible "snap" sound as the locking sleeve is pressably forced over the tips. Now, the bosses are grippingly trapped in the groove, and the tendency of the bosses to exit the groove due to the resilient biasing at the first and second faces, which may be on the order of about five to seven pounds, results in a very high frictional engagement between the tips and the locking sleeve at the recess thereof. This high friction engagement keeps the locking sleeve positioned over the tips even in the event of vibration or other adverse environmental conditions.

To open the snap lock connector 10, all the user need do is pressably slide the locking washer rearwardly to clear the tips and then pull apart the plug and receptacle bodies.

It will be understood that the low silhouette provided by the cooperative combination of the groove, the collet fingers and the locking sleeve, advantageously results in a snap lock connector having a cross-section on the order of the fiber optic cables, themselves. Further, the simplicity of manufacture of the snap lock connector 10, such as provided by a screw machine operation, results in a very low cost unit price thereof.

To those skilled in the art to which this invention appertains, the above described preferred embodiments may be subject to change or modification. Such change or modification can be carried out without departing from the scope of the invention, which is intended to be limited only by the scope of the appended claims.

What is claimed is:

1. A connector for connecting a first article to a second article therewithin, said connector comprising:
   a receptacle body having a nose, said nose having an external surface, wherein a groove is circumscribably formed in said external surface;
   a plug body having a collet comprising a plurality of resilient collet fingers, each collet finger thereof terminating in a respective tip, said plug body further having a locking sleeve slidably mounted thereto at said collet, each said tip comprising a boss means for engaging said groove and an opposing abutment means for engaging said locking sleeve;
- first mounting means for mounting a first article within said receptacle body; and
- second mounting means for mounting a second article within said plug body;
- wherein at least one of said first and second mounting means provides resilient mounting such that when said tip of each said collet finger engages said groove, the first and second articles are resiliently biased together;
- wherein when said nose is inserted into said collet said boss means engages said groove, whereupon the resilient biasing of the first and second articles causes said boss means to be partly exited with respect to said groove, whereupon when said locking sleeve is slid over said collet fingers the locking sleeve engages said abutment means so as to force said boss means further into said groove and thereby retain said tips engaged with respect to said groove.

2. The connector of claim 1, wherein said locking sleeve has a forward portion, a recess being formed at said forward portion adjacent said collet, wherein said abutment means engages said locking sleeve at said recess thereof; and wherein when said nose is inserted into said collet so that said tip of each said collet finger engages said groove, an audible sound is generated as said locking sleeve is slid over said abutment means.

3. The connector of claim 2, wherein said boss means has a chamfer for providing an initial contact location with respect to said nose when said nose is pushed into said collet.

4. The connector of claim 3, wherein said plurality of collet fingers comprises four collet fingers.

5. The connector of claim 2, wherein when said nose is inserted into said collet so that said tip of each said collet finger engages said groove and said locking sleeve is slid over said abutment means, said resilient mounting provides a frictional force between said abutment means and said locking sleeve at said recess which thereby retains said locking sleeve over said abutment means.

6. The connector of claim 5, wherein said boss means has a chamfer for providing an initial contact location with respect to said nose when said nose is pushed into said collet.

7. The connector of claim 6, wherein said plurality of collet fingers comprises four collet fingers.

8. A method for biasably abutting a first article to a second article, comprising the steps of:
- forming a nose at an end of a first body;
- circumscribing a groove on said nose in spaced relation to said end of said first body;
- mounting a first article within the first body;
- forming a collet comprising a plurality of resilient collet fingers at an end of a second body;
- mounting a sleeve to said second body in slidable relation over said collet;
- mounting a second article within the second body, wherein at least one of the steps of mounting provides resilient mounting;
- placing the nose into the collet so that the collet fingers grippingly enter into the groove, whereat said first and second articles are resiliently biased together thereby causing said collet fingers to partly exit the groove; and
- sliding the sleeve in relation to the collet to a location over the groove so as to force the collet fingers further into the groove and thereby hold the collet fingers in the gripped relation with respect to the groove.

9. The method of claim 8, wherein said step of sliding provides an audible sound.

10. The method of claim 9, wherein said steps of placing and sliding resiliently bias said first and second articles so as to generate a frictional force between said collet fingers and said sleeve.

11. A connector for connecting therewithin a first fiber optic cable segment a second fiber optic cable segment, said connector comprising:
- a receptacle body having a nose, said nose having an external surface, wherein a groove is circumscribably formed in said external surface;
- a plug body having a collet comprising a plurality of resilient collet fingers, each collet finger thereof terminating in a respective tip, said plug body further having a locking sleeve slidably mounted thereto at said collet, each said tip comprising a boss means for engaging said groove and an opposing abutment means for engaging said locking sleeve;
- first ceramic terminus means for connecting with a first fiber optic cable segment, said first ceramic terminus means having a first face;
- first mounting means for mounting said first ceramic terminus means within said receptacle body;
- second ceramic terminus means for connecting with a second fiber optic cable segment, said second ceramic terminus means having a second face; and
- second mounting means for mounting a said second ceramic terminus means within said plug body;
- wherein at least one of said first and second mounting means provides resilient mounting such that when said tip of each said collet finger engages said groove, the first and second faces are resiliently biased together; and
- wherein when said nose is inserted into said collet said boss means engages said groove, whereupon the resilient biasing of the first and second ceramic terminus means causes said boss means to be partly exited with respect to said groove, whereupon when said locking sleeve is slid over said collet fingers the locking sleeve engages said abutment means so as to force said boss means further into said groove and thereby retain said tips engaged with respect to said groove.

12. The connector of claim 11, wherein said locking sleeve has a forward portion, a recess being formed at said forward portion adjacent said collet, wherein said abutment means engages said locking sleeve at said recess thereof; and wherein when said nose is inserted into said collet so that said tip of each said collet finger engages said groove, an audible sound is generated as said locking sleeve is slid over said abutment means.

13. The connector of claim 12, wherein said boss means has a chamfer for providing an initial contact location with respect to said nose when said nose is pushed into said collet.

14. The connector of claim 13, wherein said plurality of collet fingers comprises four collet fingers.

15. The connector of claim 12, wherein when said nose is inserted into said collet so that said tip of each said collet finger engages said groove and said locking sleeve is slid over said abutment means, said resilient mounting provides a frictional force between said abutment means and said locking sleeve at said recess which thereby retains said locking sleeve over said abutment means.

16. The connector of claim 15, wherein said boss means has a chamfer for providing an initial contact location with respect to said nose when said nose is pushed into said collet.

17. The connector of claim 16, wherein said plurality of collet fingers comprises four collet fingers.

* * * * *